(12) United States Patent
Trotman et al.

(10) Patent No.: US 7,693,385 B1
(45) Date of Patent: Apr. 6, 2010

(54) WORKSTATION FOR FIBER OPTIC SPLICER

(75) Inventors: Billy Shane Trotman, Fort Payne, AL (US); Tony Nelson Newsome, Rainsville, AL (US); James Hugh Bennett Roberts, Henegar, AL (US)

(73) Assignee: TNR Communications, LLC, Henagar, AL (US)

( * ) Notice: Subject to any disclaimer, the term of this patent is extended or adjusted under 35 U.S.C. 154(b) by 26 days.

(21) Appl. No.: 12/190,448

(22) Filed: Aug. 12, 2008

Related U.S. Application Data

(60) Provisional application No. 61/004,504, filed on Nov. 28, 2007.

(51) Int. Cl.
*G02B 6/00* (2006.01)

(52) U.S. Cl. .................... 385/134; 385/95; 385/96; 385/97

(58) Field of Classification Search .................... 385/95, 385/96, 97, 98, 99, 134, 147
See application file for complete search history.

(56) References Cited

U.S. PATENT DOCUMENTS

| | | | |
|---|---|---|---|
| 3,516,514 A * | 6/1970 | Malloy et al. ................. 182/46 |
| 5,386,490 A * | 1/1995 | Pan et al. ..................... 385/134 |
| 5,897,081 A * | 4/1999 | Dechen ........................ 248/61 |
| 6,322,178 B1 * | 11/2001 | Dominique ............... 312/330.1 |
| 6,764,229 B1 | 7/2004 | Iga et al. ........................ 385/98 |
| 6,890,109 B2 | 5/2005 | Arima et al. ................... 385/98 |
| 7,063,311 B1 * | 6/2006 | Ascolese ...................... 269/69 |
| 7,489,849 B2 * | 2/2009 | Reagan et al. ............... 385/135 |

OTHER PUBLICATIONS

"ASW-02 Splicing Workstation," AFL Telecommunications, p. 28, 2002.

* cited by examiner

*Primary Examiner*—Brian M Healy
(74) *Attorney, Agent, or Firm*—Lanier Ford Shaver & Payne, P.C.; Jon E. Holland

(57) ABSTRACT

A portable workstation for splicing fiber optics has slots that slip over a side of a bucket of an aerial bucket truck. The slots provide for a secure attachment of the workstation to the bucket. The workstation has hand slots so that the workstation is easily manipulated for attaching or removing the workstation to/from the bucket. Within the workstation is a pocket having a cavity for securely holding a fusion splicer. The workstation has a work area, adjacent to the splicer, for holding splicing tools and other materials used for making a fiber optic splice.

20 Claims, 12 Drawing Sheets

WORKSTATION FOR FIBER OPTIC SPLICER

CROSS REFERENCE TO RELATED APPLICATION

This application claims priority to U.S. Provisional Patent Application No. 61/004,504, entitled "Workstation Fiber Optic Splicer," and filed on Nov. 28, 2007, which is incorporated herein by reference.

BACKGROUND

In the communication service business, such as the telecommunication business or the cable television business, the physical channels for carrying signals comprises a variety of cables, such as twisted copper pairs, coaxial cables or optic fibers. For new installations and maintenance, it is often necessary to splice the physical channels in order to provide or repair a connection from the provider to the customer. The physical channels are often placed above the existing terrain (aerial installations) or buried underground or placed elsewhere.

In general, a technician that splices such channels works in a variety of environments, which range from inside areas with controlled environments to outside areas with extreme weather conditions. The equipment used to provide splices and the physical channel being spliced need an environment suitable for providing a good splice and a safe situation for the technician. Because the demand for bandwidth continues to increase and cost of optical fiber has decreased, a fiber communication channel is considered a great value for providing high bandwidth. Hence technicians are busy with installations of fiber that require splicing of optical fibers. Fusion splicers have been developed for splicing a first fiber optic to a second fiber optic.

Fusion splicing uses heat to join two optical fibers end-to-end. The objective is to fuse the two fibers together in such a way that light passing through the fibers is not scattered or reflected back by the splice, and so that the splice and the region surrounding it are just about as strong as the virgin fiber itself. The source of heat for the fusion splicer is usually an electric arc, but can also be a tungsten filament through which current is passed.

Several steps are necessary to splice optical fibers including stripping the coating off the two fibers to be spliced together and then cleaning the fibers. Next, each fiber is cleaved so that its endface is substantially flat and perpendicular to the axis of the fiber. Then the two endfaces of the fibers are aligned. After the fibers are aligned, the two fibers are fused together. Finally, the bare fiber area is protected either by recoating or installing a splice protector. In addition, it is often desirable to perform a proof-test to ensure that the splice is strong enough to survive handling, packaging and extended use.

Alternatives to fusion splicing include using optical fiber connectors or mechanical splices. Such alternative splicing techniques generally produce a splice having higher insertion losses, lower reliability and higher return losses than the splice provided by a fusion splicer.

Fusion splicing machines or fusion splicers for fiber-optic cables are relatively expensive, and historically fiber splices were performed in stable, controlled environments such as in "splicing trailers," portable splicing labs, or in cable vaults. However, recent industry trends have driven the need for technicians to be able to splice fiber-optic cables basically anywhere, quickly and easily. One of the most difficult locations to splice fiber-optic cables is actually in aerial closures where the technician performs a splice from a bucket of an aerial bucket truck, in a splicing closure usually suspended about 15-30 feet from the ground. Technicians must not only worry about the fact that the splicing tools are exposed to the weather, but also the fact that it is very difficult to secure the splicing machine in a manner that facilitates a safe and easy fiber-optic splice.

To alleviate several of the aforementioned problems with splicing fiber, several workstations have been proposed. However, such workstations do not meet the needs of a telecommunication technician splicing fibers in many environments where telecommunication fibers serve as communication channels.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to a multipurpose workstation that provides a worker, such as a telecommunication technician, with a work space for splicing fiber-optic cables or other cables. The workstation provides a worker with a work area for splicing fiber optics in a wide range of locations. In one embodiment of the disclosure, the workstation is adapted for mounting to a bucket of an aerial bucket truck.

In order to splice fiber optics located above the local terrain, the technician, the workstation, splicer and tools are moved to a desired location by the bucket of the aerial bucket truck. After the bucket is in the desired position and has a desired orientation, which is often about 15 to 30 feet or more above the local terrain, for splicing the fiber optics, the workstation is secured to the bucket. In addition, the technician attaches a splicer, such as a fusion splicer, to the workstation. It is desirable for the splicer to be secured to the workstation in order to reduce the chance that the splicer will accidentally fall from the bucket of the aerial bucket truck. In addition, the splicer is oriented so that a first fiber optic and a second fiber optic may be aligned for insertion into the splicer. The technician uses several splicing tools to prepare the fiber optics for splicing. In one exemplary embodiment, the workstation has a work area or tray, comprised of a work surface surrounded by a raised border wherein the splicing tools, such as a fiber cleaver, a fiber stripper, cleaning materials and other equipment are within convenient reach of the technician.

In one exemplary embodiment, the splicer is attached to the workstation by inserting the splicer into a pocket of the workstation that this is adapted for securely holding the splicer. Because splicers are available from a variety of manufacturers, such splicers have a variety of shapes and sizes. Hence, the cavity of the pocket is adjustable in order to securely hold a selected splicer. In one exemplary embodiment of the disclosure, the size of the pocket cavity is modified by inserting a divider bar in vertical grooves in members of a pocket structure as will be seen. Other embodiments for changing the pocket size may use other structures. For other embodiments, other techniques for securely coupling the splicer to the workstation may be used, such as, for example, clamps, magnets, Velcro™ strips and similar attachment components.

Figure 1:
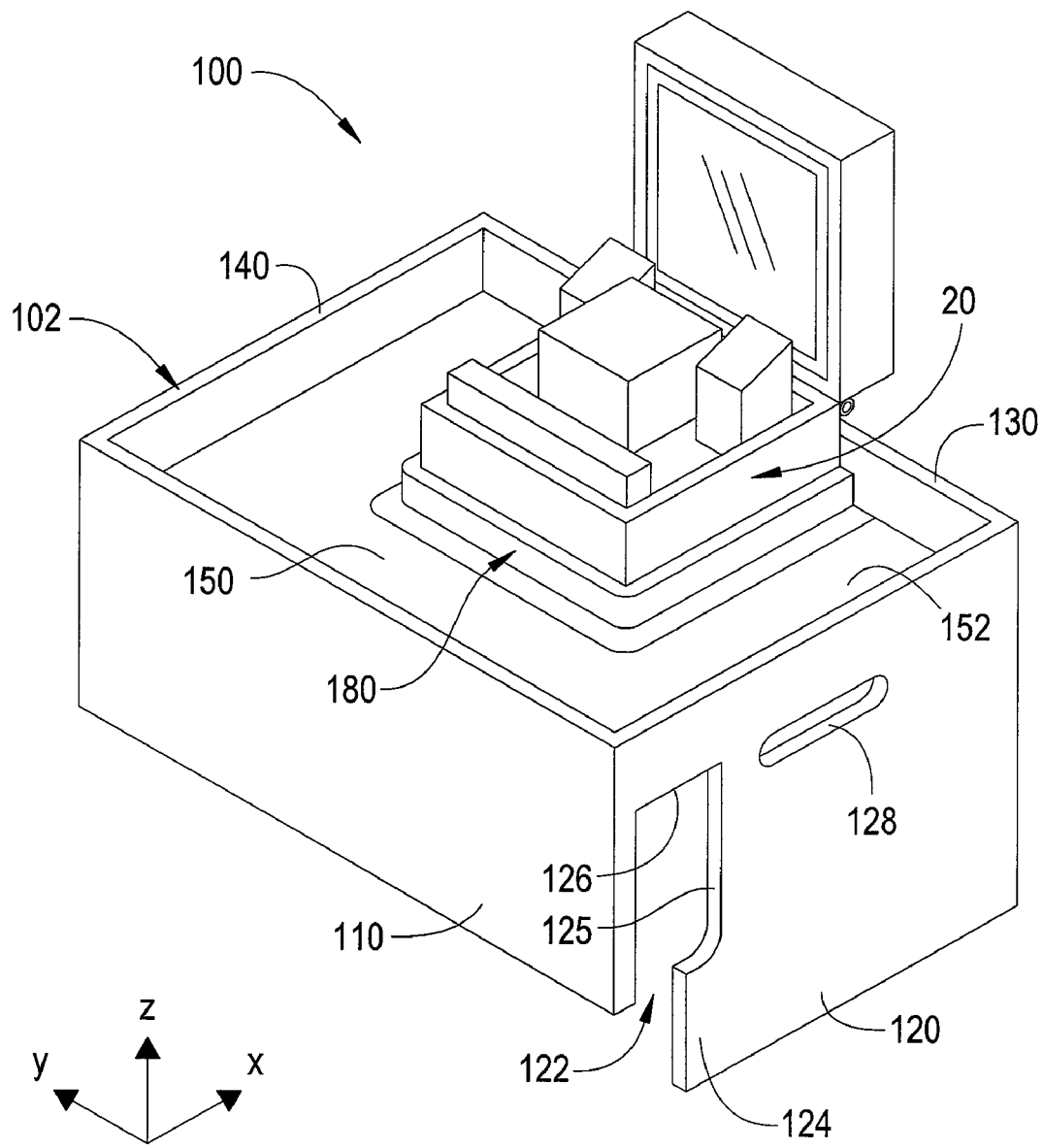
FIG. 1 depicts an exemplary embodiment of a workstation having a removable pocket in accordance with the present disclosure.

FIG. 1 depicts an exemplary embodiment of a workstation 100 with a fusion splicer 20 placed in a pocket 180 of the workstation. As depicted in FIG. 1, the interior surfaces of the pocket 180 define a cavity that approximates the outside shape of the case of the splicer 20. In this regard, the cavity corresponds to the shape of the case such that the case fits snugly in the cavity thereby securing the splicer 20 to the workstation 100. A portion of the splicer 20 extending upward, the z-direction, from the pocket 180 so that optical fibers have the necessary clearance for aligning and inserting the fibers into the splicer 20.

Figure 2:
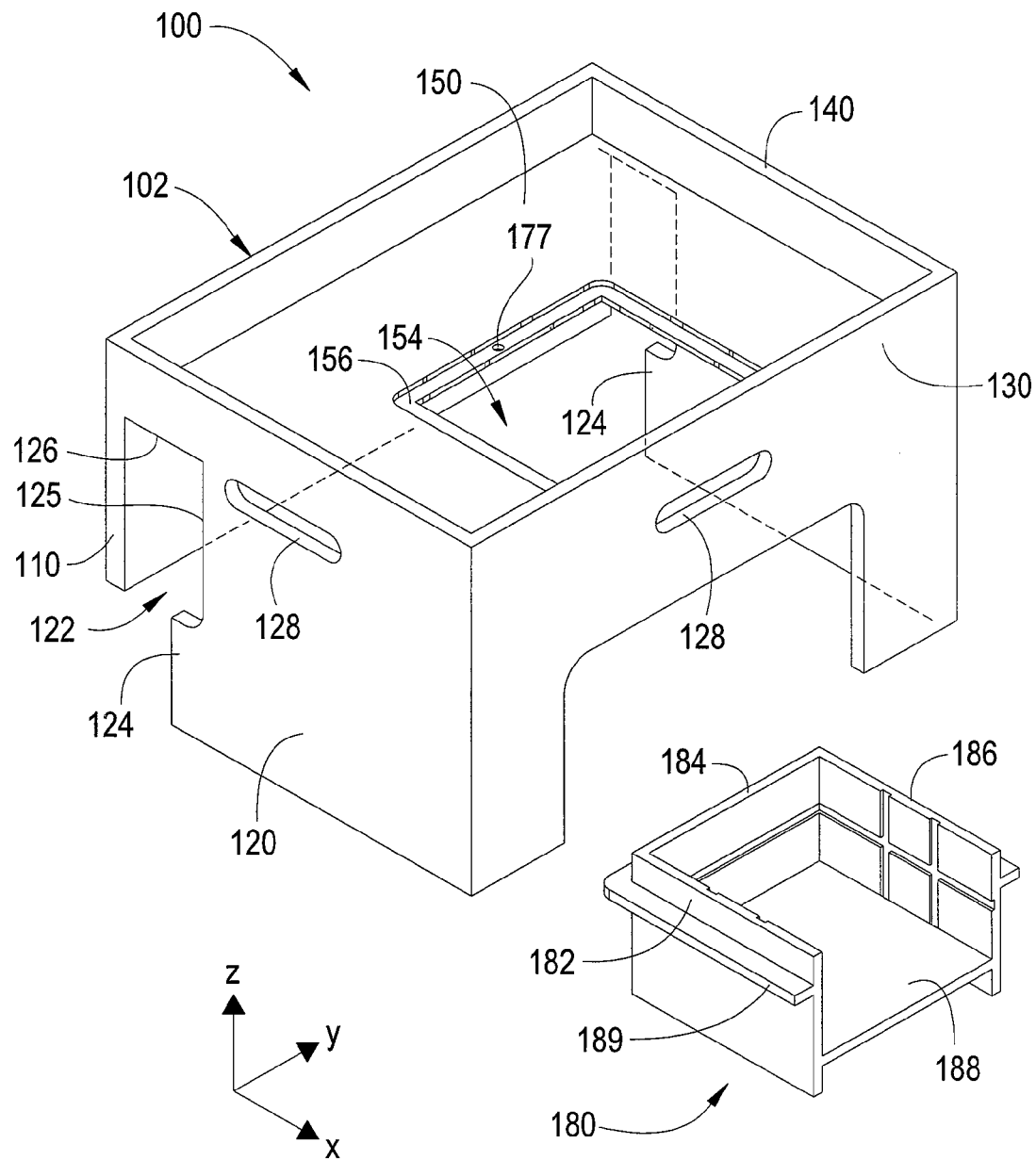
FIG. 2 depicts the workstation of FIG. 1 with the pocket removed from the workstation.
Figure 16:
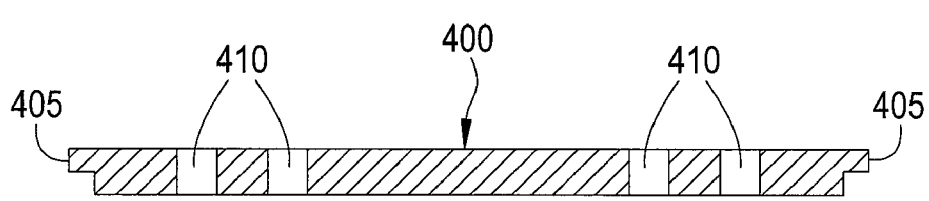
FIG. 16 is a cross-sectional view of the tie-down plate of FIG. 15.

The workstation 100 has vertical sides including a front side 110, a right side 120, a left side 140 and a back side 130. Mounted between the interior walls of the vertical sides 110, 120, 130, 140 is a top side 150 that has a surface 152. A portion of the surface 152 of the top side 150 serves as a working area for placing splicing tools and other items needed by the technician. The vertical sides 110, 120, 130, 140 extend above the surface 152 of the top side 150 thereby providing a barrier to help prevent tools from inadvertently getting knocked off the work surface and falling to the ground. The top side 150 also has a pocket aperture 154 for receiving the pocket 180 as depicted in FIG. 2. The pocket aperture 154 has a ledge 156 adapted to engage with a lip 189 on pocket 180. In another embodiment, wherein pocket 180 is removed, the ledge 156 of aperture 154 is adapted to engage a lip 405 of a tie-down plate 400 depicted in FIG. 16.

The right side 120 of the workstation 100 has a hand slot 128 with a generally rectangular shape of approximately 2 inches by 5 inches with rounded corners, although other shapes for the slot 128 are possible. The left side 140 has a similar hand slot 128 (shown in FIG. 5). The hand slots 128 are located so that the technician can simultaneously grasp surfaces of the right side 120 and the left side 140 of the workstation 100 by sliding a hand through each respective slot 128. When the technician grasps the workstation 100, using the hand slots 128 on the right side 120 and left side 140, the technician can easily manipulate the workstation 100 for installing or removing the workstation 100 from the bucket 300 of the aerial bucket truck or other similar structure.

The right side 120 of the workstation 100 has a mounting slot 122 adapted to fit over a lip 306 (FIG. 4) of a bucket 300 of an aerial bucket truck. The mounting slot 122 is defined by edges of the right side 120 including edge of a tab 124, adjacent edge 125 and top edge 126 on the right side 120 and a portion of the interior surface of the front side 110. Similarly, the left side 140 of the workstation also has mounting slot 122 formed by a respective tab 124, adjacent edge 125 and top edge 126 on the left side 140 and a portion of the interior surface of the front side 110. Various shapes of the slots 122 are possible.

Figure 4:
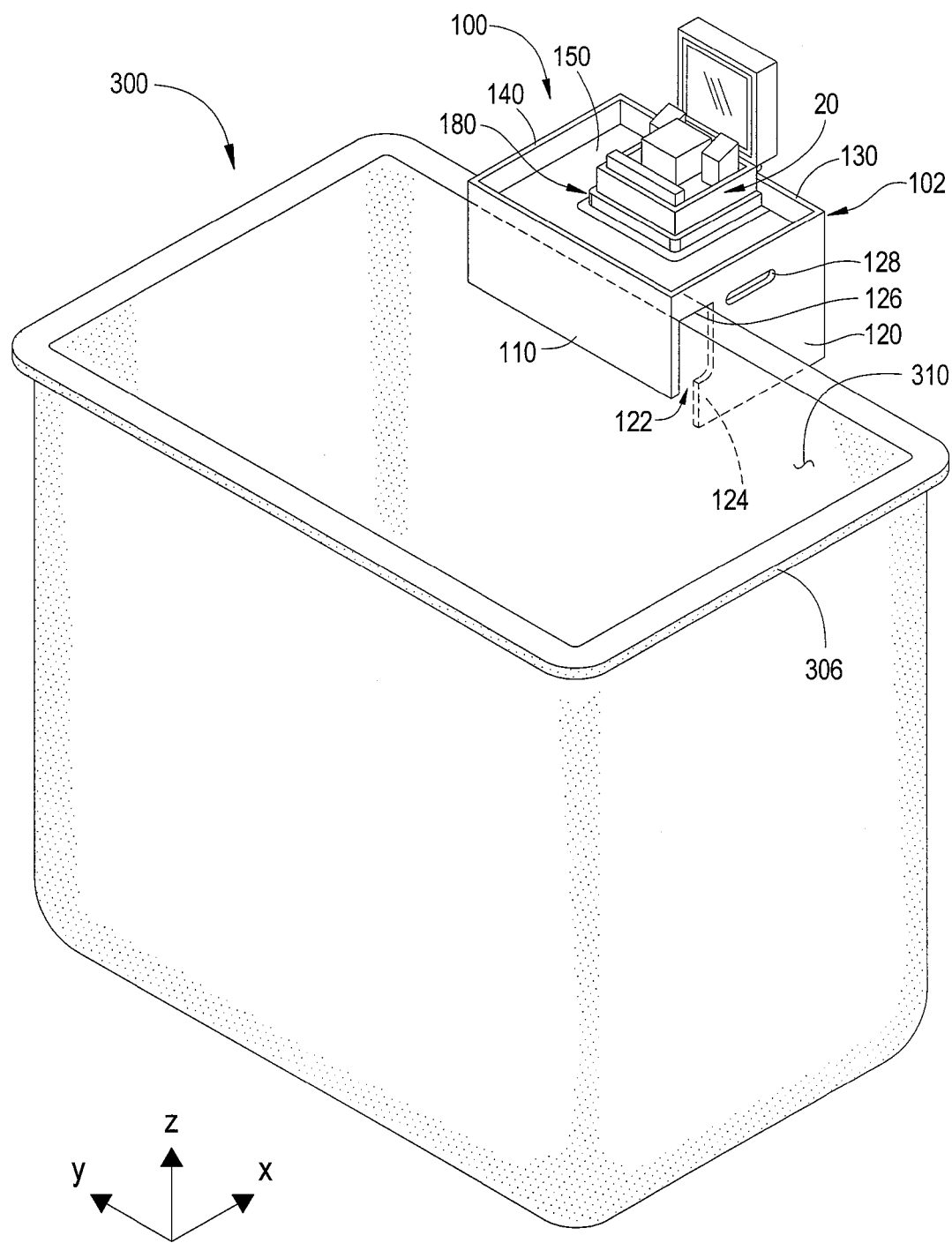
FIG. 4 depicts the workstation of FIG. 1 mounted on a bucket an aerial bucket truck.

When a technician manipulates the workstation 100 for installation using the hand slots 128 or otherwise, the technician tilts (about the y-axis) the workstation 100 inward, i.e., the front side 110 moves downward (the minus z-direction) and the back side 130 moves upward (the z-direction), so that mounting slots 122 fit over the lip 306 of the bucket 300. After the lip 306 of the bucket 300 is within the mounting slots 122, the workstation 100 is tilted (about the y-axis) outward so that front side 110 of the workstation is approximately vertical (the z-direction) and the tabs 124 contact the bucket 300. FIG. 4 depicts the workstation 100 installed on the bucket 300 of an aerial bucket truck.

When the workstation 100 is installed, the top edge 126 of each of the mounting slots 122 rests on the lip 306 of the bucket 300 and a portion of the interior surface of the front side 110 rests on an interior surface of a front wall 310 of the bucket 300. The force exerted on the workstation 100 by the bucket lip 306 to counteract the weight of the workstation generates a moment that tends to rotate the workstation about the y-axis. However, such moment presses the tabs 124 against an outside surface of the bucket 300. Accordingly, the weight of the workstation 100 (and the forces generated by the bucket 300 counteracting such weight) sufficiently secures the workstation 100 to the bucket 300 such that clamps or other attachment mechanisms are unnecessary.

FIG. 2 depicts an exemplary embodiment of the workstation 100 with the packet 180 removed from the workstation 100. Note that, for simplicity of illustration, the splicer 120 is not shown in FIG. 2. The workstation 100 comprises a support structure 102 and the pocket 180. The pocket 180 has vertical sides including a right side 182, a front side 184 and a left side 186. A bottom side 188 fits within the vertical sides and provides a surface for supporting the splicer 20. The pocket 180 is dimensioned to fit within a pocket aperture 154 of the support structure 102. Extending around the top edges (the edges furthest from the bottom side 188) of the pocket vertical sides 182, 184, 186, of the pocket 180 is a pocket lip 189. The pocket lip 189 rests on a surface of the top side 150 when the pocket is bolted or otherwise coupled to the support structure 102. When the pocket 180 is placed within the pocket aperture 154 of the support structure 102, a bolt passes through bolt holes 177 to securely couple the pocket 180 to the support structure 102. Other fasteners may be used in other embodiments. In one embodiment, the pocket lip 189 fits within and rests on the ledge 156 on the top side 150 of the support structure 102. The interior surfaces of the pocket sides 182, 184, 186, the interior surface of the bottom side 188 and a portion of the interior surface of the back side 130 of the support structure 102 define a pocket cavity in which a splicer 20 (not shown in FIG. 2) can be inserted.

In one exemplary embodiment, the interior of the pocket 180 has a width of approximately 8 inches (measured in the y-direction), a length of approximately 8 inches (measured in the x-direction) and a depth of approximately 4 inches (measured in the z-direction). For other embodiments other interior dimensions for the pocket 180 are possible. In general, pocket cavity dimensions are chosen so that a selected splicer 20 is securely contained within the pocket cavity of pocket 180.

Figure 3:
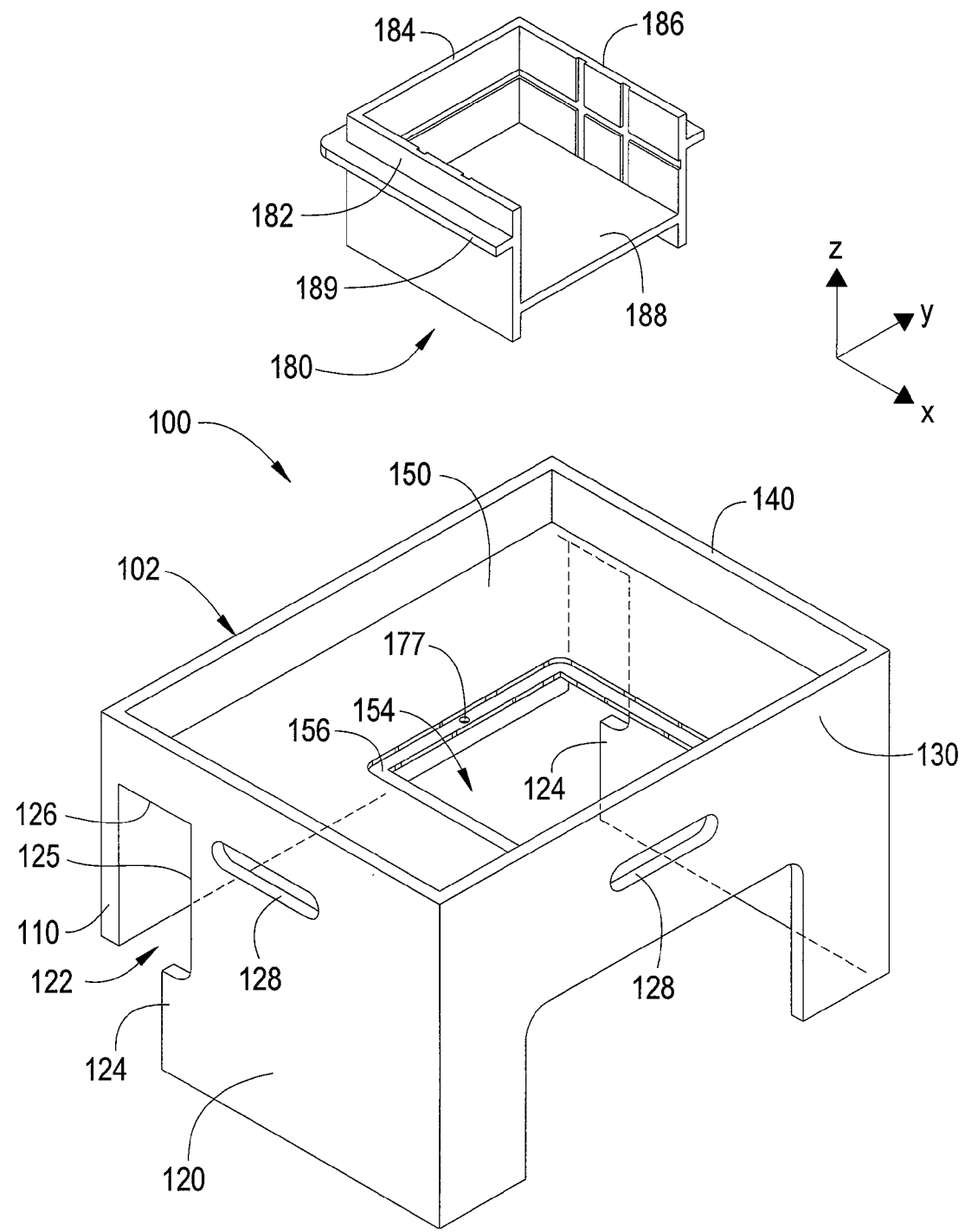
FIG. 3 depicts the workstation of FIG. 2.

FIG. 3 depicts the workstation 100 shown in FIG. 2. In FIG. 3 the pocket 180 is oriented for insertion into the pocket aperture 154 of support structure 102. A bolt hole 177 on the flange 189 adjacent to the back side 184, depicted in FIG. 13, aligns with the bolt hole 177 in the ledge 156 of the support structure 102.

FIG. 4 depicts workstation 100 installed on the bucket 300 of an aerial bucket truck. The bucket 300 has a front side 310 with a lip 306. The lip 306 is a flange extending outward from the top of sides of the bucket 300. In other embodiments, other types of buckets may be used.

The mounting slots 122 on the right side 120 and left side 140 of the workstation 100 are adapted to fit over the sides of the bucket 300. When the workstation 100 is secured to the bucket 300, the front side 310 of the bucket 300 is within the mounting slots 122 of workstation 100. The workstation 100 may also be mounted on other sides of the bucket 100. In other embodiments of workstation 100, other techniques may be used for securing the workstation 100 to the bucket 300.

Figure 5:
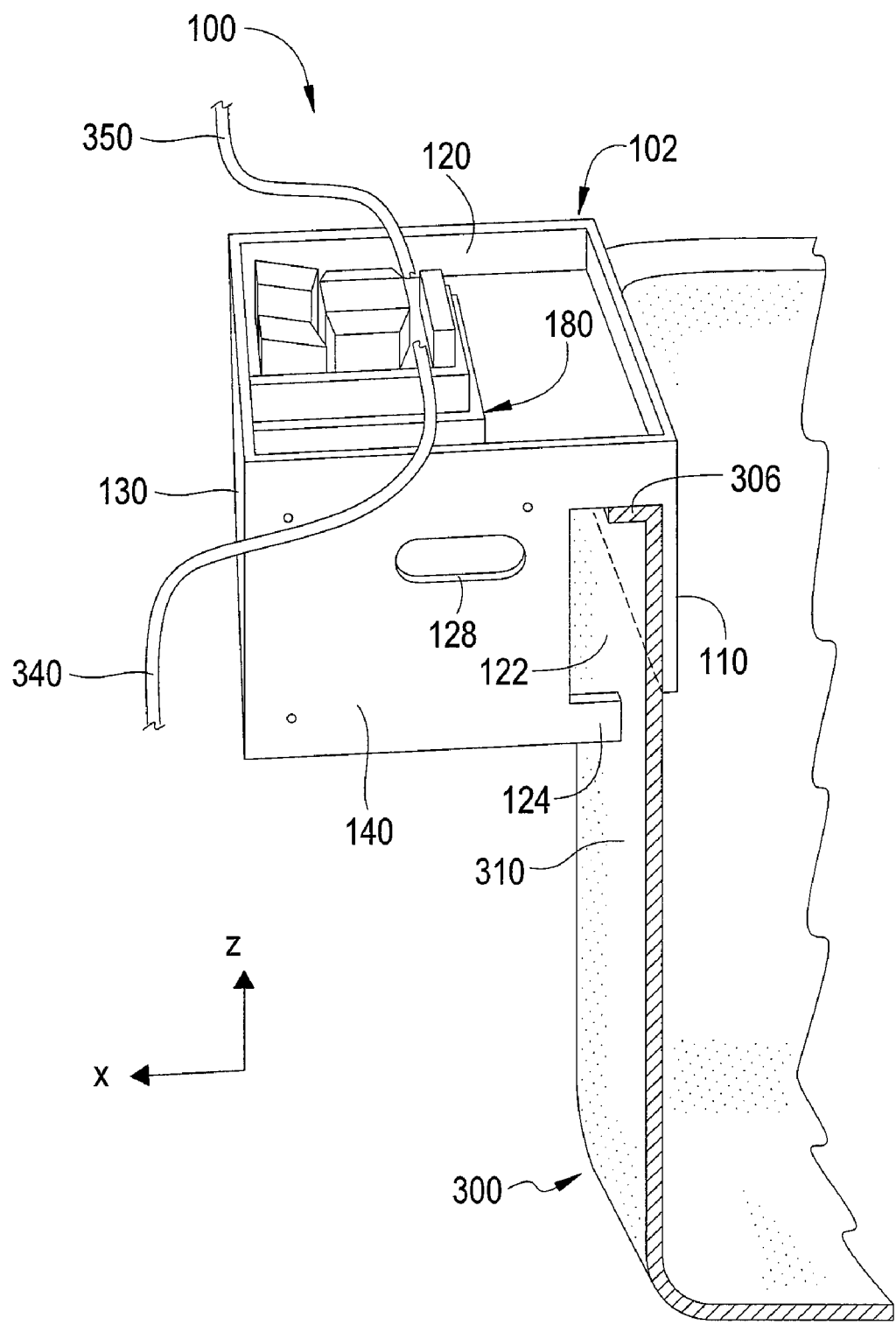
FIG. 5 depicts a side view of the workstation of FIG. 1 mounted on a bucket of an aerial bucket truck.

FIG. 5 depicts a partial side view of the workstation 100 mounted to the bucket 300 as observed when looking towards the left side 140 of the workstation 100. The splicer 20 is located in the pocket 180 of the workstation. Tools and splicing materials may be placed on the top surface 152 the workstation 100. A first optical fiber 340 and a second optical fiber 350 have fiber ends extending towards the splicer 20.

Figure 6:
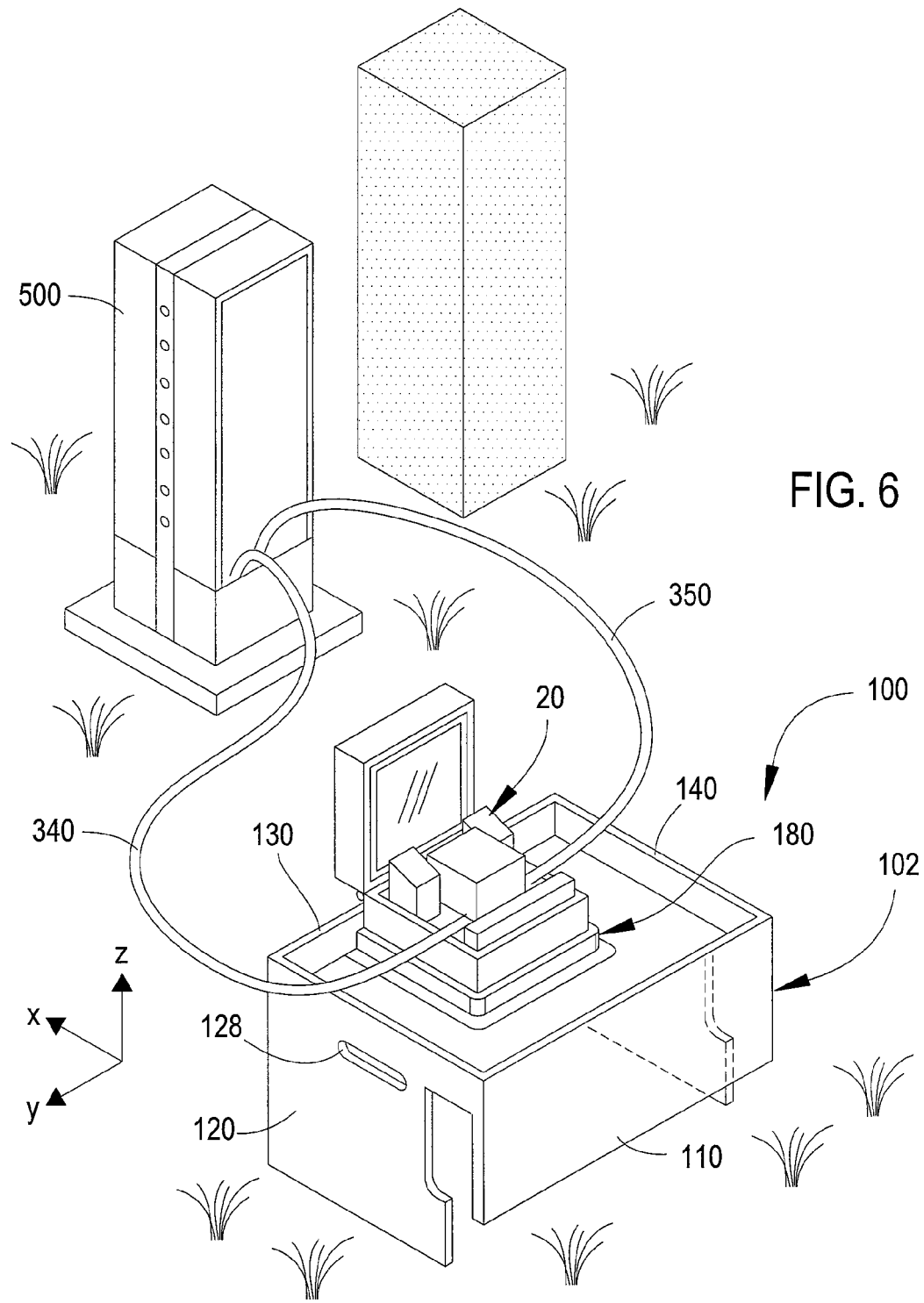
FIG. 6 depicts the workstation of FIG. 1 positioned for splicing fiber optics at a telecommunication pedestal.

The workstation 100 of FIG. 1 and splicer 120 can be used for splicing fiber optics at other locations such as depicted in FIG. 6. When a pedestal 500, such as a telecommunication pedestal, contains optic fibers 340, 350 that require splicing, workstation 100 provides a suitable work area for the technician. The bottom edge of the left side 140, the right side 120 and the back side 130 are placed on the ground or other surface so that the top side 150 is approximately parallel to the ground. The splicer 20 is in the pocket 180 of the workstation 100 so that the fiber optics 340, 350 extending from the pedestal 500 are positioned for splicing. The workstation 100 is oriented so that one optic fiber 340 is on one side of the splicer 20 and the second optic fiber 350 is on another side of the splicer 20. In other embodiments of the workstation 100, other leg structures are possible.

The embodiment of workstation 100 as depicted in FIG. 1 is composed of high-density polyethylene so as to eliminate or reduce damages to the workstation 100 that may be caused by weather or other environmental conditions. The high-density polyethylene used to fabricate the workstation 100 is ultraviolet and chemical resistant and has electrical insulation characteristics sufficient to protect a technician should the workstation 100 accidentally contact a high-voltage cable. Other materials may be used in other embodiments of the workstation 100.

Figure 7:
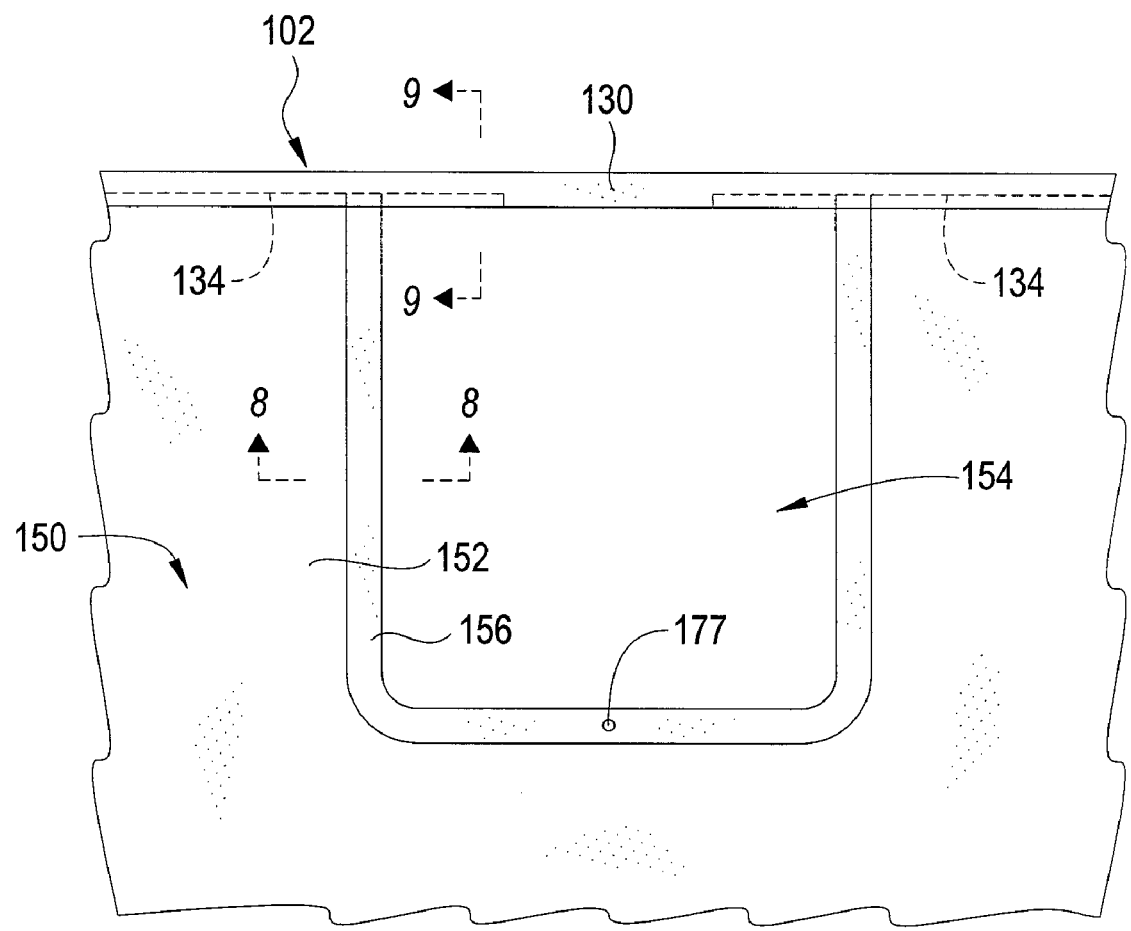
FIG. 7 depicts a portion of the workstation of FIG. 1.
Figures 8, 9:
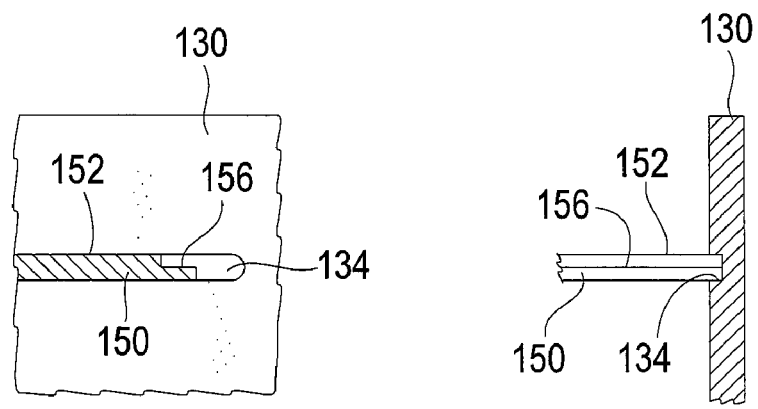
FIG. 8 is a cross-sectional view of the workstation portion depicted in FIG. 7.
FIG. 9 is another cross-sectional view of the workstation portion depicted in FIG. 7.

Details of a support structure 102 for an exemplary embodiment of a workstation 100 are depicted in a partial top view of FIG. 7. The pocket aperture 154 in the top side 150 of the support structure 102 is adapted for receiving pocket 180. The edges of the pocket aperture 154 have a ledge 156 as seen in FIG. 8 for supporting a portion of pocket 180 as will be seen. The groove 134 in front side 130 of the support structure as shown in FIG. 9 is engaged with the top side 150 and is also adapted to receive a support tab extending from the pocket 180.

Figure 10:
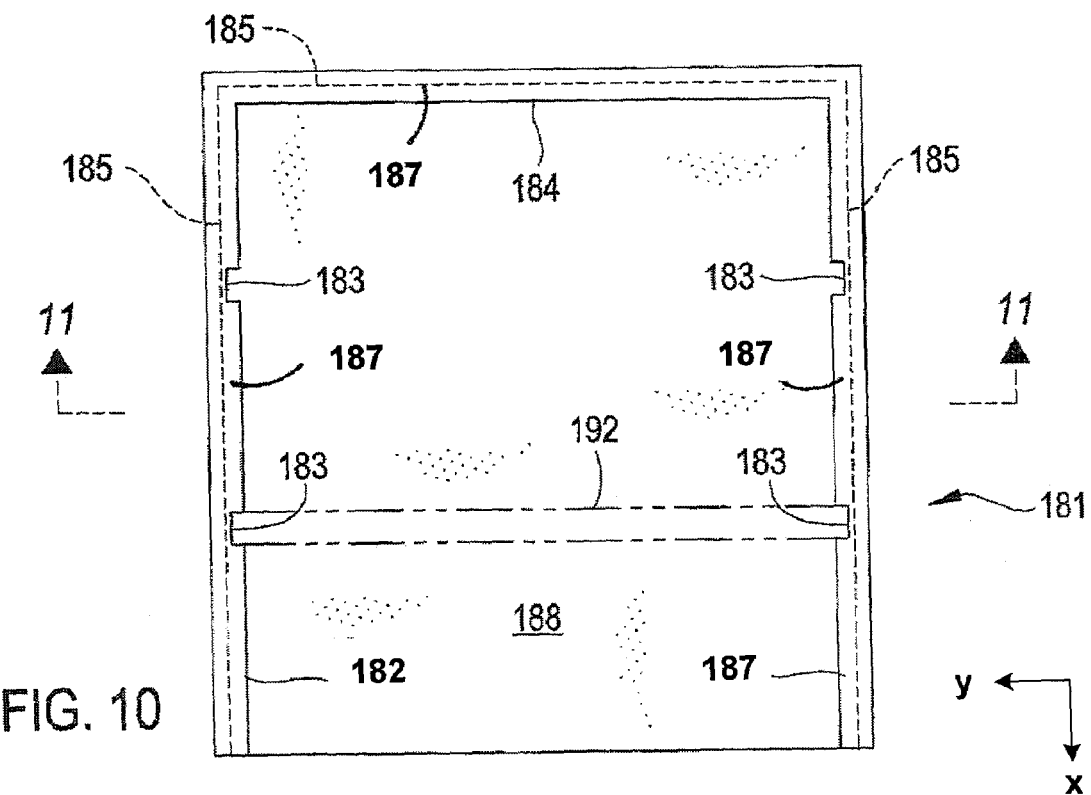
FIG. 10 depicts an exemplary embodiment of a pocket structure for the workstation of FIG. 1.
Figure 11:
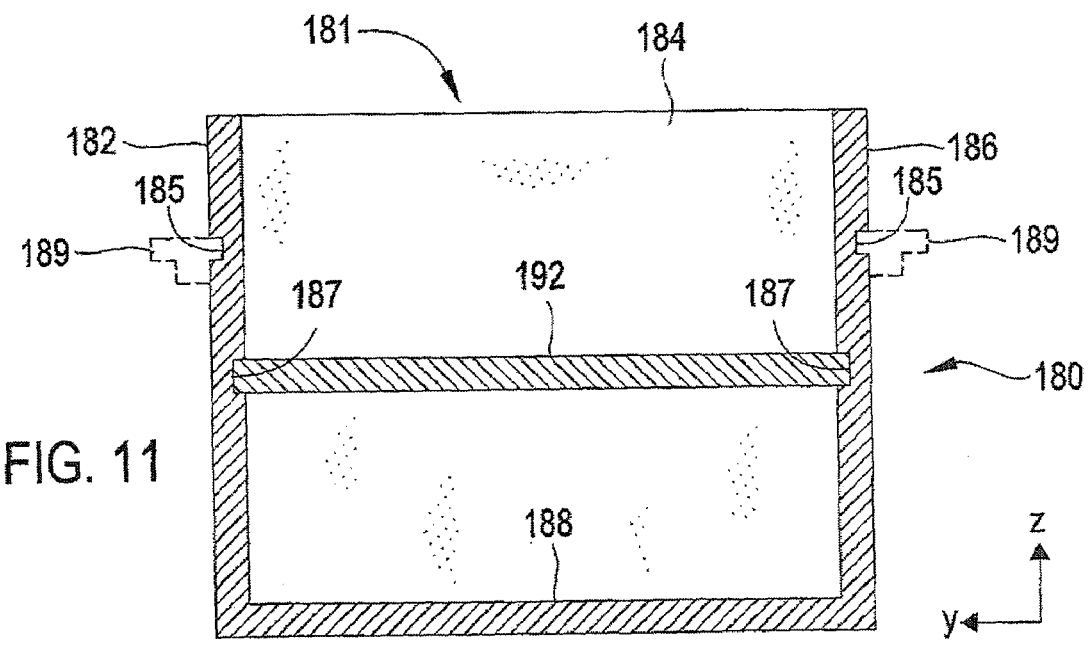
FIG. 11 is a cross-sectional view of the pocket structure of FIG. 10.
Figure 12:
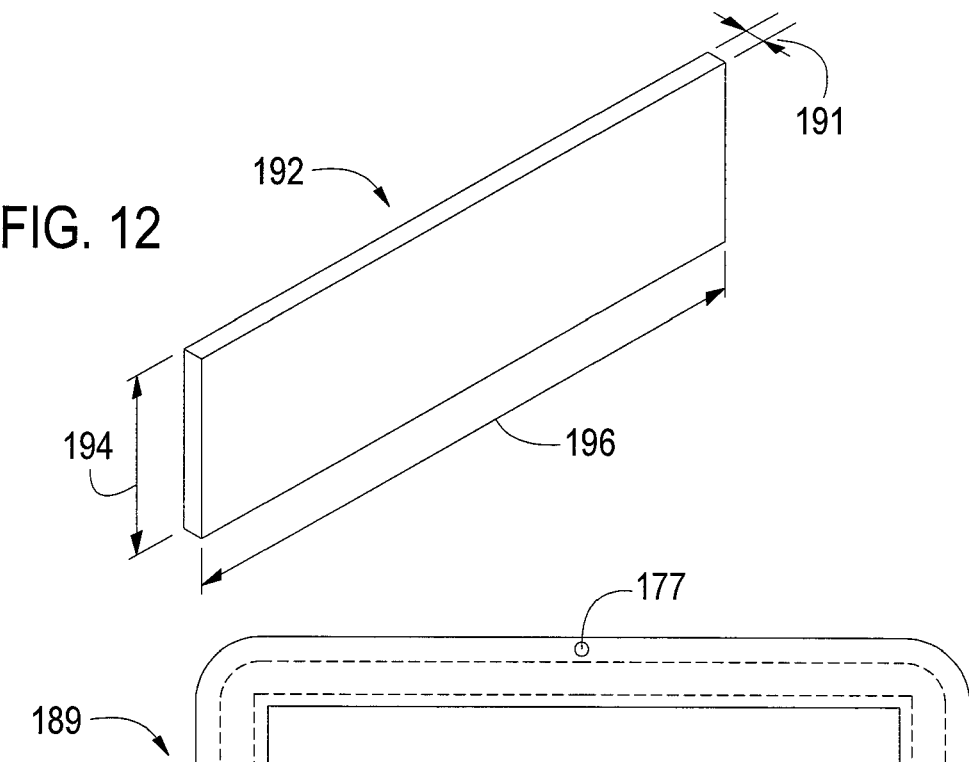
FIG. 12 depicts a divider plate for the pocket structure of FIG. 10.

An exemplary embodiment of the pocket 180, having an adjustable cavity, comprises a pocket structure 181, one or more divider bars 192, and a pocket flange 189. The pocket structure 181 is depicted in FIG. 10 and FIG. 11. The pocket structure 181 comprises vertical sides 182, 184, 186 and a bottom side 188. The thickness of the material, such as high-density polyethylene, of the embodiment is approximately a half an inch. The right side 182 and left side 186 of the pocket structure 181 have vertical slots 183 for receiving a divider bar 192 as shown in FIG. 12. The vertical slots 183 are approximately parallel to the front vertical side 184. Each vertical side 182, 184, 186 has a horizontal slot 187 parallel to the bottom side 188 of the support structure 181.

In an embodiment depicted in FIG. 12, the divider bar 192 has a divider bar width 194, a divider bar length 196 and a thickness 191. Although the divider bar 192 as depicted in FIG. 12 has rectangular shape other shapes are possible in other embodiments. The divider bar width 194 and length 196 are selected so that the divider bar 192 fits snugly in vertical slots 183 or horizontal slots 187 of pocket structure 182.

For an embodiment of the pocket 180, the size of the cavity is defined the cavity dimensions as depicted in FIG. 10 and FIG. 11. The length of the pocket cavity is measured in the x-direction, the width of the pocket cavity is measured in y-direction, and the depth of the pocket cavity is measured in the z-direction. When a single divider bar 192 is inserted in a pair of the vertical slots 183, the pocket cavity is divided into two sections wherein each section has approximately the same width (measured in the y-direction). The length of each of the section is dependent on the location of the vertical divider slots 183 as depicted in FIG. 10. When the divider bar 192 is adapted for snugly fitting between vertical slots 183, the divider bar length 196 is slightly less than the distance between the back surface (the surface parallel to the x axis) of each vertical slot 183. The width 194 of the divider bar for insertion into vertical slots 183 is approximately equal to the depth of the pocket cavity (measured in the z-direction).

The divider bar 192 serves to adjust the depth of the pocket cavity when inserted in horizontal slots 187. When the divider bar 192 is adapted to fit snugly within horizontal slots 187, the width 194 of the divider bar 192 is slightly less than the distance between the back surfaces (the surface parallel to the z axis as depicted in FIG. 11) of horizontal slots 187 in the right side 182 and the left side 186. The length of the divider bar 192 when placed in horizontal slots 187 is slightly greater than the length of the pocket cavity (measured in the x-direction). When the divider bar 192 is installed in the pocket structure 181 for modifying the depth of the pocket, one end of the divider bar fits snugly in a horizontal slot 187 in the front side 184 of the pocket, and other sides of the divider bar fit snugly in horizontal slots 187 in the left side 186 and right side 182 of the pocket structure 181.

Figure 13:
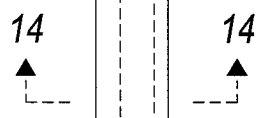
FIG. 13 shows a flange assembly adapted for coupling to the pocket structure of FIG. 10.
Figure 14:
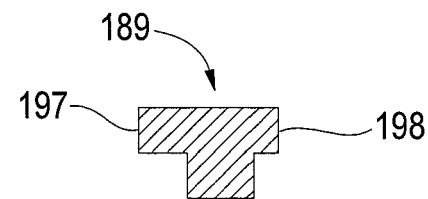
FIG. 14 is a cross-sectional view of the flange assembly of FIG. 13.

FIG. 13 depicts a pocket flange 189 that slides into the flange groove 185 of pocket structure 181. The pocket flange 189 is U-shaped and has a screw hole 177 at the bottom of the U-shape, although other shapes of the flange 189 are possible. The screw hole 177 is located to receive a screw or a bolt for attaching the pocket flange 189 to the top side 150 of the support structure 102. A cross-sectional view of the pocket flange 189 is depicted in FIG. 14. The cross-sectional view of the pocket flange 189 shows an inner tab 198 and an outer tab 197. The inner tab 198 slides into the flange groove 185 of the pocket assembly 181 and the outer tab 197 rests on the ledge 156 of the top side 150 of the support structure 102 when the workstation 100 is assembled.

Figure 15:
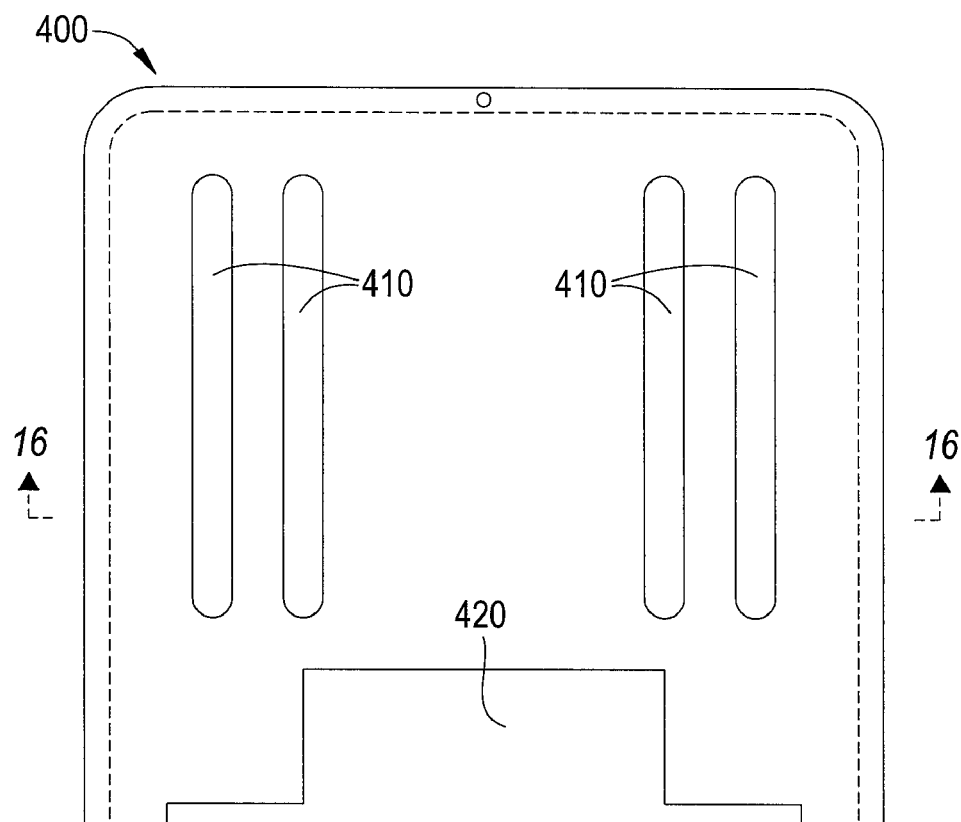
FIG. 15 shows an exemplary tie-down plate for an embodiment of a workstation of the present disclosure.
Figure 17:
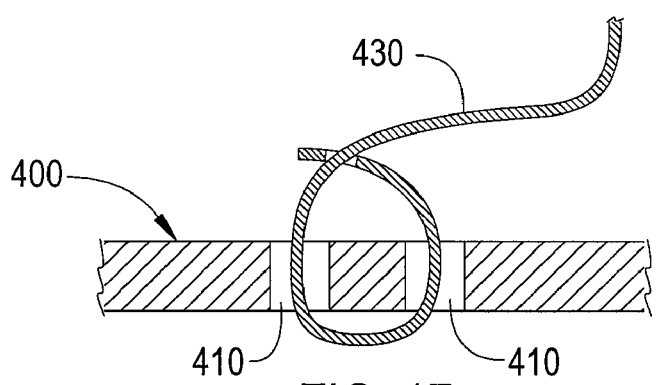
FIG. 17 is another cross-sectional view of the tie-down plate of FIG. 15.

FIG. 15 shows an exemplary embodiment of a tie-down panel 400 for attaching the splicer 20 to workstation 100. The tie-down panel 400 is dimensioned to fit in the pocket aperture 154 as shown in FIGS. 7, 8 and 9. The tie-down panel 400 rests on the ledge 156 of the top side 150 of the workstation 100. A flange 405 of the tie-down panel 400, as shown in the cross-sectional view of FIG. 16, extends on three sides of the tie-down panel 400 and rests on the ledge 156 of the top side 150 of the support structure 102 when the workstation 100 is assembled. The tie-down panel 400 also has a panel aperture 420 that allows access to hand slot 128 on the back side 130 of the assembled workstation 100. The tie-down panel 400 has strap slots 410 that are adapted for coupling to a variety of tie-down straps 430. In one exemplary embodiment, tie down strap 430 loops through a pair of the tie-down slots 410 as shown in FIG. 17. In one exemplary embodiment, a tie-down strap 430 is coupled to first strap slots 410 and another tie-down strap 430 is coupled to second strap slots 410. The tie-down straps 430 extend over the splicer 20 when the splicer is placed on the top surface of the tie-down panel 400. The tie-down straps 30 are connected together on their ends to secure the splicer 20 to the workstation 100.

Figure 18:
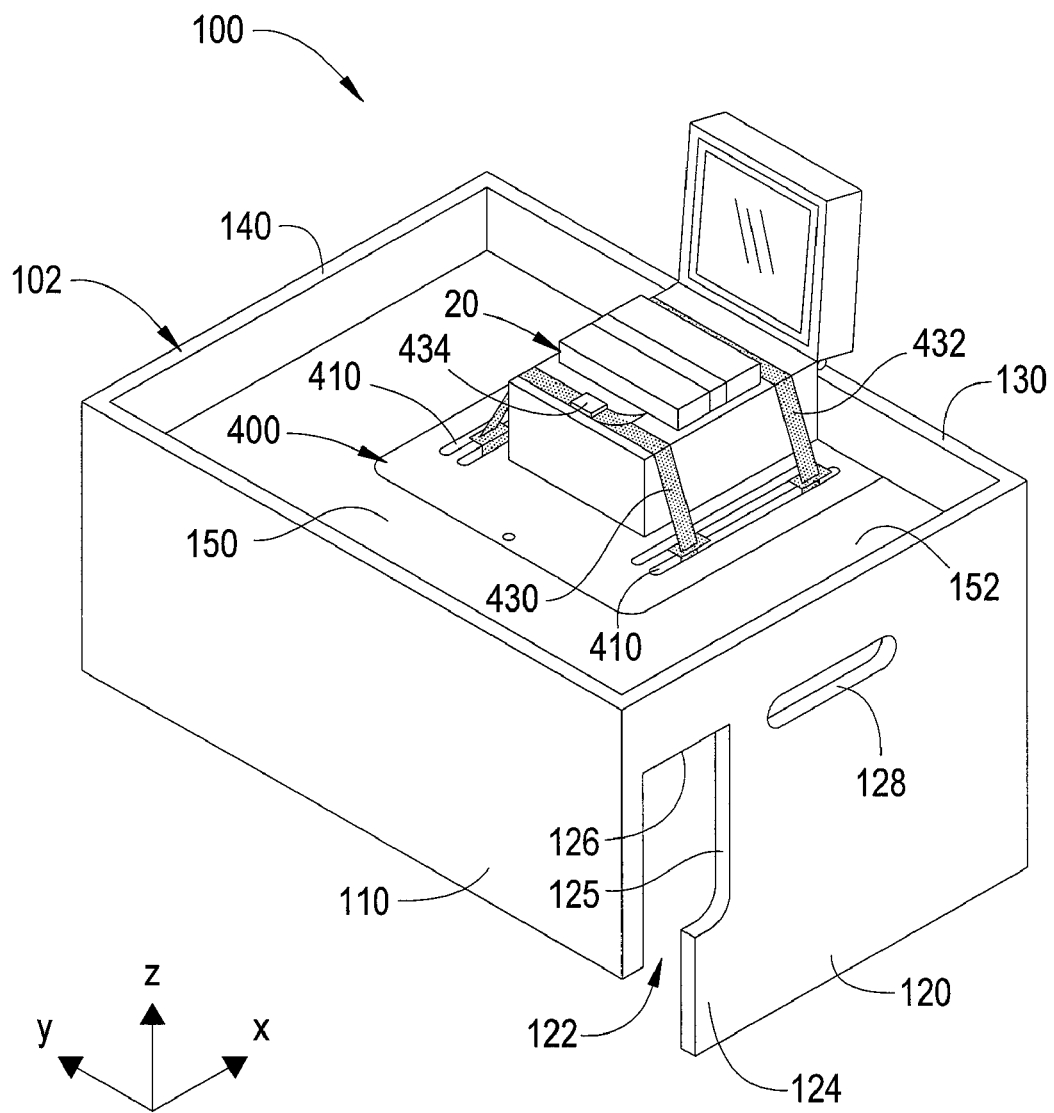
FIG. 18 depicts an exemplary embodiment of the workstation of FIG. 1 having a removable tie-down plate.

FIG. 18 depicts workstation 100 with tie-down plate 400 coupled to support structure 102. Tie-down strap 430 and tie-down strap 432 extend from tie-down slots 410 and rest on the top side of the splicer 20. The tie-down straps 430, 432 fit snugly over the splicer 20 and are attached with a fastener 434 for securing the splicer 20 to the workstation 100. The tie-down straps 430, 432 are positioned over the splicer 20 so as to secure the splicer 20 to the workstation 100 without interfering with the splicing procedure.

In one embodiment the tie-down straps are essentially flat and the fastener 434 is a buckle. In other embodiments other shapes for the tie-down straps are possible. In other embodiments other fasteners are possible, such as, for example, Velcro™ connectors, clips or hooks.

Figure 19:
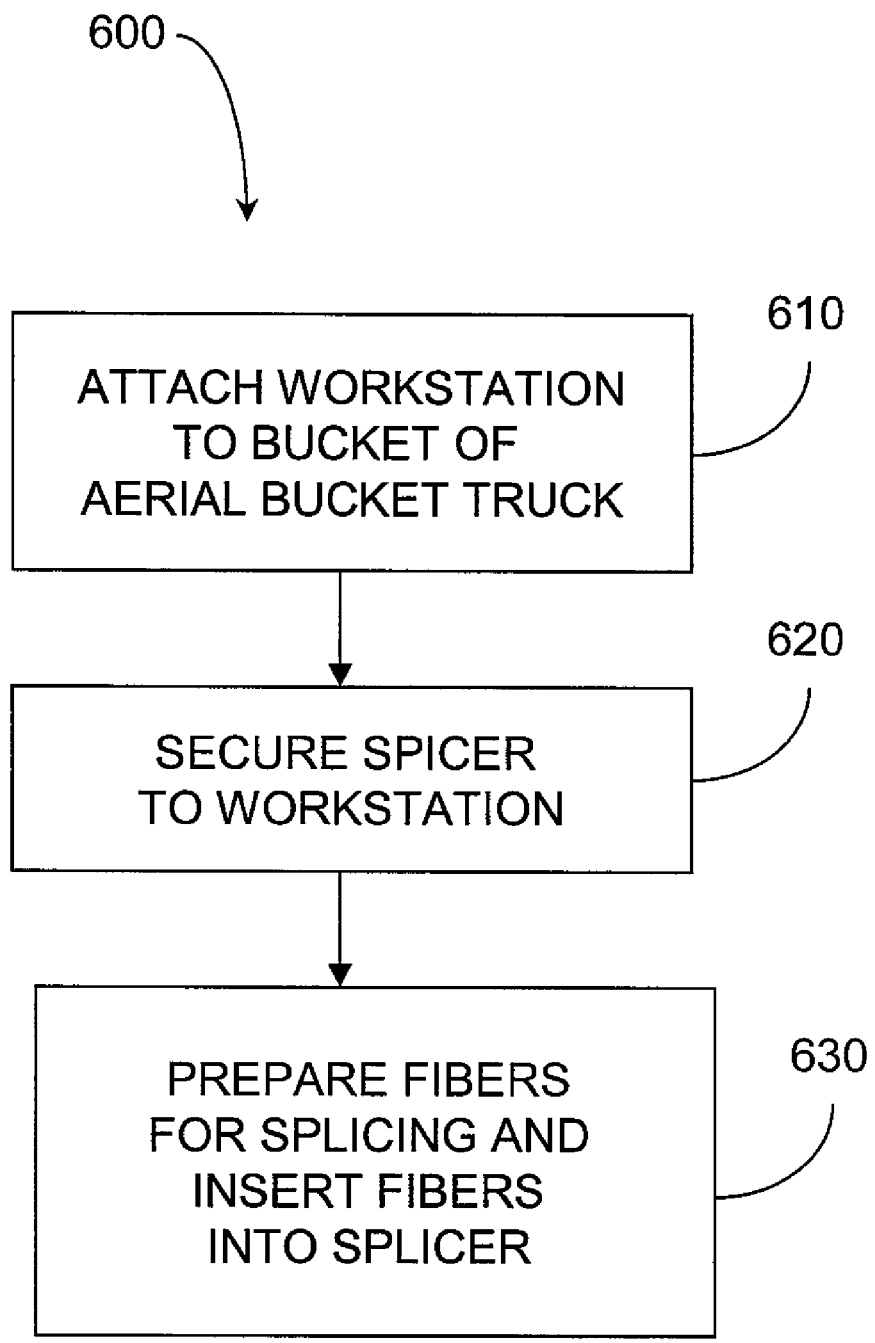
FIG. 19 depicts an exemplary method for splicing optical fibers using a workstation, such as is depicted by FIG. 1.

A method embodiment 600 for splicing fiber optics in accordance with the present disclosure is depicted in FIG. 19. After the workstation 100, splicer 20 and a technician are in a position for splicing fiber optics, the workstation 100 is secured to the bucket 300 of an aerial bucket truck, step 610. The workstation 100 as depicted in FIG. 1 has attachment slots 122 that, when the workstation 100 is tilted, slip over a wall of the bucket 600 in such a way that the wall of the bucket is sandwiched between edges of the attachment slots. After the workstation 100 is secured to the bucket 300, the splicer 20 is secured to the workstation 100, step 620. In one exemplary embodiment, the splicer 20 is secured to the workstation by inserting the splicer 20 in pocket 180. Other techniques, such as attaching with straps, are possible in other method embodiments. After the splicer 20 is secured, a first fiber and a second fiber are prepared for splicing and inserted into splicer, step 630. When the splicing preparation is complete, the prepared end of the first fiber is spliced to the prepared end of the second fiber using the splicer 20. After the splicing is complete, the technician removes the splicer from the workstation and then removes the workstation from the bucket 300. The bucket is then moved to a new position for splicing if necessary.

It should be further emphasized that the above-described embodiments of the present disclosure are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the claims of a utility application.

Now, therefore, the following is claimed:

1. A workstation for holding a splicer, the workstation comprising:
   a support structure having at least one mounting slot for securing the support structure to a bucket of an aerial bucket truck; and
   a pocket mounted within the support structure and adapted for holding the splicer.

2. The workstation of claim 1, wherein the pocket fits within an aperture in the support structure.

3. The workstation of claim 1, wherein the support structure has a work surface surround by a containment wall.

4. The workstation of claim 1, wherein the workstations has legs for supporting the structure for a ground use application.

5. The workstation of claim 1, wherein the support structure has vertical sides and a top side.

6. The workstation of claim 5, wherein the at least one vertical side has a hand slot.

7. The workstation of claim 1, wherein the workstation is secured to the bucket by tabs pressing against the side of the bucket.

8. A workstation comprising:
   a support structure with two or more sides and a top side wherein the top side is adapted to fit between surfaces of the sides, and wherein the sides have mounting slots adapted to engage a wall of a bucket of an aerial bucket truck; and
   a means for securing a splicer attached to the support structure.

9. The workstation of claim 8, where the means for securing the splicer is a cup having a cavity adapted to receive the splicer.

10. The workstation of claim 9, wherein the size of the cavity of the cup is adjustable.

11. The workstation of claim 9, wherein the walls of the cup has slots for receiving divider bars.

12. The workstation of claim 8, wherein the means of securing the splicer is one or more tie-down straps.

13. The workstation of claim 8, wherein the workstation is adapted to rest on terrain next to a telecommunication pedestal.

14. The workstation of claim 8, wherein a portion of the surface of the top side of the support structure serves as a work area.

15. A method for splicing fiber optics, comprising:
   installing a workstation to a bucket of an aerial bucket truck;
   securing a fusion splicer to the workstation;
   preparing a first optic fiber and a second optic fiber for splicing; and
   splicing the fiber optics with the fusion splicer.

16. The method of claim 15, wherein the installing comprises:
   tilting the workstation from a first position to a second position so that a slot on workstation fits over a wall of the bucket;
   returning the workstation to the first position; and
   releasing the workstation when edges of the slot engage surfaces of the bucket wall.

17. The method of claim 15, wherein the securing comprises:
   aligning the splicer to fit in a pocket cavity; and
   placing the splicer in the pocket cavity.

18. The method of claim 15, wherein the securing comprises:
   placing the splicer on a tie-down panel; and
   connecting and tightening tie-down straps about the splicer.

19. The method of claim 15, further comprising removing the splicer from the workstation.

20. The method of claim 19, further comprising disengaging the workstation from the bucket.

* * * * *